June 24, 1969 H. HAHN ETAL 3,452,191

MICROWAVE DEFLECTION SYSTEM FOR SUPERCONDUCTING PARTICLE SEPARATOR

Filed May 24, 1967 Sheet 1 of 2

INVENTOR.

HENRY J. HALAMA

BY HAROLD HAHN

Roland A. Anderson
Attorney

INVENTOR.
HENRY J. HALAMA
BY HAROLD HAHN
Roland A. Anderson
Attorney

United States Patent Office 3,452,191

Patented June 24, 1969

3,452,191

MICROWAVE DEFLECTION SYSTEM FOR SUPER-CONDUCTING PARTICLE SEPARATOR

Harald Hahn, East Patchogue, and Henry J. Halama, Shoreham, N.Y., assignors to the United States of America as represented by the United States Atomic Energy Commission Filed May 24, 1967, Ser. No. 642,663
Int. Cl. B01d 59/44
U.S. Cl. 250—41.9 7 Claims

ABSTRACT OF THE DISCLOSURE

A superconducting radio frequency particle separator for producing long pulses in excess of 100 milliseconds for the extraction of charged particles from a high energy charged particle beam, having first and second oscillator circuits formed with first and second spaced high Q deflectors, the circuits having a phase bridge with a variable phase shifter for phase locking the respective deflectors, and an adjustable short for the deflectors for varying the path length of the fields propagating through each deflector for tuning them to match the resonant frequencies in each deflector at the desired mode.

*Cross-reference to related applications*

U.S. application S.N. 580,513 filed Sept. 19, 1966, by Hahn and Halama.

*Background of the invention*

The success of the CERN and BNL RF beam separators has stimulated interest in RF separators capable of producing long pulses in excess of 100 milliseconds, particularly for accelerators of increased energy, and superconducting separators have been suggested therefor since they can provide the long pulses required. Features for the superconducting separators that have been considered are described in Internal Report AR/Int. PSep/63–1, CERN, 1963; IEE Trans. NS–12, No. 3, p. 1045, 1965; 1966 G-MTT Symposium Digest, p. 69; International Advances in Cryogenic Engineering, ed. K. D. Timmerhaus, vol. 10, p. 88, Plenum Press, New York, 1965; Microwave Engineering, Academic Press, London, 1963, p. 201; and Applied Superconductivity, J. Wiley and Sons, Inc., New York, 1964, p. 247.

The microwave system for an RF separator using superconducting deflectors differs significantly from the conventional systems operating at room temperature in view of the increased Q factors required in the superconducting case, up to $5\times10^8$ or more. The high Q value is essential as the dissipation in the superconducting deflector must be limited to <100 w., due to the difficulties in removing heat at low temperatures, e.g. $\sim2°$ K. Also, the lower bandwidth requirements in the superconducting case result in the imposition of more stringent requirements on the stability of the signal source for the system. This will be understood, since the deflectors used in radio-frequency charged particle beam separation systems for high energy accelerators, such as the BNL Alternating Gradient Synchrotron, require that the two opposite deflectors in each cell both be synchronous with the particles in the beam, i.e. have the same phase shift per cell at the operating frequency. In the existing room temperature systems a discrepancy between deflectors can be corrected by maintaining the deflectors at slightly different temperatures, but this freedom no longer exists in the superconducting case. It is additionally desirable to avoid complexity and mechanical problems by providing a standing wave separation system having separate commercially available electrical energy sources for separating charged particles from a beam traveling along an equilibrium axis in an evacuated tube.

An object of this invention, therefore, is to provide a practical and efficient long pulse time, high Q, RF separating system for high energy charged particle beams by providing stable circuit means for synchronizing RF particle separating deflectors with the particles in the beam;

A further object is to provide two superconducting deflectors that look like two tuned circuits of very high Q, between about $10^8$ and $10^9$;

A further object is to provide two phase locked superconducting deflectors with standard or inexpensive signal sources;

A still further object is to provide a variable length path length for the fields propagating through RF particle separating deflectors so that the resonant frequency of the deflectors can be varied around the resonant frequencies of different standing wave modes, i.e. on the dispersion diagram prescribed by the geometry of the deflectors.

The above and further novel features and objects of this invention will appear more fully from the following detailed description when the same is read in connection with the accompanying drawings. It is to be expressly understood, however, that the drawings are not intended as a definition of the invention but are for the purpose of illustration only.

*Summary of the invention*

The foregoing objects are achieved by adjustably shorting phase locked deflectors with vacuum tight diaphragms in rectangular wave guides connected to the deflectors. In one embodiment, the RF separator of this invention, consists basically of two deflectors that look like two tuned circuits of very high Q, between $10^8$ and $10^9$, that are brought to the same resonant frequency through the use of specific microwave circuits whose phase is carefully controlled by phase locking the respective deflectors at their input ends, and means including an adjustable short that varies the path length of the fields propagating through each deflector for tuning them to match the resonant frequencies in each deflector at the desired mode between $\pi/2$ and $2\pi/3$. With the proper selection of components and connections, as described in more detail hereinafter, the desired long pulse time, high Q, stable, synchronized, high energy charged particle beam separation is achieved.

*Brief description of the drawings*

In the figures where like elements are referenced alike.

*Description of the preferred embodiment*

Figure 1:
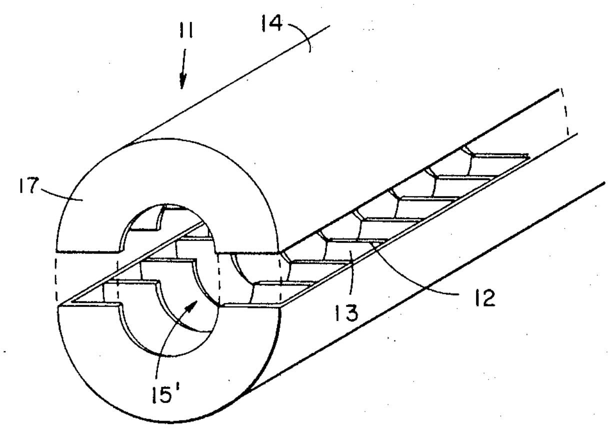
FIGURE 1 is a partial three-dimensional drawing of one deflector of the RF particle separator of this invention with the deflector split open to view the inside for ease of explanation.

Referring now to FIGURE 1, one half of a RF charged particle separator 11, i.e. one deflector 17 of two like deflectors, is shown for the high energy beam of an alternating gradient synchrotron, such as the Brookhaven National Laboratory 33 GeV AGS, wherein the charged particles are separated from a beam traveling along an equilibrium axis in an evacuated tube. It is understood, however, that the RF separator 11 of this invention is useful in the separation or extraction of any charged particle from a beam in any high energy accelerator, storage ring or beam transport system.

If the same frequency as for existing normal temperature BNL separators is used in a high Q or superconducting RF separator, the bandwidth is:

$$\Delta f=\frac{f}{Q}=\frac{2.85\times 10^9}{5\times 10^8}H_z\approx 6\ H_z$$

This extreme narrow bandwidth imposes stringent requirements on the stability of the signal source for the superconducting or high Q system.

Considering several figures of merit used in connection with conventional linacs and deflectors, their dependence on the frequency $\omega$, for both the superconducting and the room temperature structure, is:

$$R=E_0^2/\alpha_z P$$
$$Q=-\omega W/\alpha_z P$$
$$R/Q=E_0^2/\omega W$$

where $E_0$=equivalent deflecting field, R=shunt impedance, $\alpha_z P$=power loss in the structure, and W=stored energy per unit length. At room temperature $Q\propto\omega^{-1/2}$, $R\propto\omega^{1/2}$, and $R/Q$ is, therefore, proportional to $\omega$.

At the frequencies and temperatures of interest the surface resistance, $r_s$, of a superconductor can be written approximately as $$r_s\propto\frac{1}{Q}\propto\frac{\omega^2}{T}e^{-\epsilon/kT}$$

with $2\epsilon$=energy gap, $k$=Boltzmann's constant.

Q will, therefore, vary as $\omega^{-2}$ and R as $\omega^{-1}$.

Also, lower operating frequencies are clearly preferable for superconducting separators from the point of view of power dissipation and achievable deflection.

A mathematical treatment of several conflicting parameters, such as frequency, group velocity and number of irises per wave length, are given by the applicants of this invention in Rev. Sci. Instr. 36, 1788, 1965.

Figure 2:
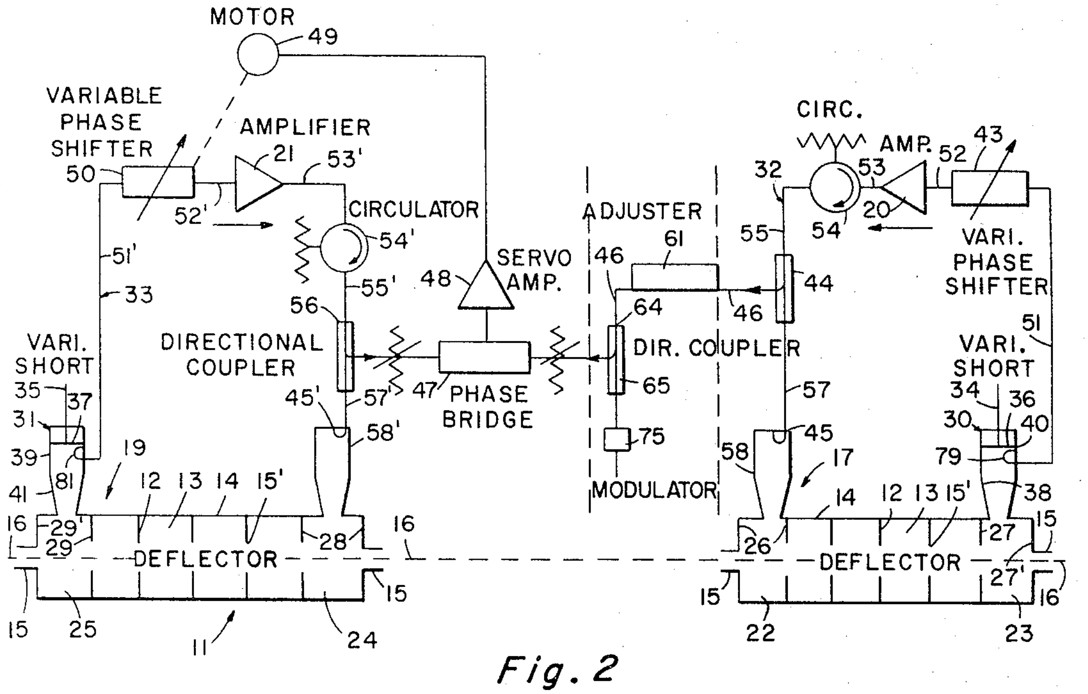
FIGURE 2 is a partial schematic drawing of the overall microwave system for the apparatus of FIG. 1, showing the actual unsplit deflector configuration of this invention.

As shown in FIG. 2, each of a plurality of co-axial plates 12 form annular irises, the adjacent irises forming sequential cells 13 inside a right circular cylindrical shell 14 co-axial with an evacuated beam tube 15 that connects with the beam holes 15' at the center of annular plates 13 along the beam equilibrium axis 16. Deflector 17 is shown in FIGURES 1 and 2, but as will be understood in more detail hereinafter, separator 11 comprises two like deflectors 17 and 19.

Also, as will be understood from the following, the phase slip, $\varphi$, of a particle traversing each deflector of the separator 11 due to a frequency error $\Delta f$ is given by:

$$\varphi=kl\left(\frac{c}{v_g}-1\right)\frac{\Delta f}{f}$$

where $k=2\pi/\lambda_0$, $l$=deflector length and $v_g$=group velocity.

Allowing a 100 kHz. error at 2.856 gHz. in a deflector with $l$=2m. and $|v_g/c|=0.02$, $\varphi=2.2\times 10^{-1}\approx 12.6°$. The resulting reduction in deflection equals $\varphi^2/24\approx 0.2\%$, which is completely negligible. The inventors herein have discussed this parameter in BNL Accelerator Report ADD–91.

The superconducting deflectors 17 and 19 can be lead plated OFHC copper, cooled to 1.8° K. The materials and temperatures are not limited to these materials and temperatures, however, since the critical temperature (Tc) of lead=7.19° K., which greatly simplifies the cryogenics and considerably reduces the initial as well as the operating costs. Also, niobium niobium-tin or other conventional materials may be used, provided they have the required microwave frequencies and high power properties, as will be understood by one skilled in the art in connection with this application.

The cooling of each deflector is conventional in that the deflectors 17 and 19 and their shells 14, are enclosed by suitable means (not shown) so as to form evacuated, longitudinally, extending chambers with each deflector 17 and 19 disposed symmetrically around the axis of their shells 14 along axis 16. By circulating liquid helium in an annular space formed by a cylindrical double walled vessel between cryogenic insulation on the outside thereof and shell 14 on the inside thereof, the shell 14 and the deflectors 17 and 19 are maintained at superconducting temperatures. Also, the deflectors are energized from, suitable, separate, microwave energy sources 20 and 21, such as either klystrons or traveling wave tubes, hereinafter referred to as TWT's, which are commercially available. As is understood in the art, the sources are connectd respectively to cells 22 and 23 and 24 and 25 at the ends of the deflectors 17 and 19 between the respective irises 26 and 27 and 28 and 29 by appropriate conductors having vacuum tight wave guides that pass through the insulation, the cryogenic cooling chamber, and shell 14 to communicate with the end cells of the deflectors.

Since it is extremely difficult to bring the two circuits of $Q\approx 5\times 10^8$, represented by deflectors 17 and 19, to the same resonant frequency the tolerances in frequency require accurate machining of the inside diameter of each shell 14 of the deflectors of separator 11. An accuracy of better than 4 microns is required without dimpling, which is a method commonly used in electron linacs, and with dimpling this requirement is only about 4 microns. Moreover, tunable means are required between the deflectors 17 and 19.

In accordance with one embodiment of this invention, adjustable shorts 30 and 31 are provided in respective oscillator loops 32 and 33 for deflectors 17 and 19 to provide a variable path length for the fields propogating through the deflectors. By varying the postion of the short adjustments 34 and/or 35 to deflect the center of diagrams 36 and/or 37 the resonant frequency of the deflectors can be varied around the resonant frequencies of different modes on the dispersion diagram prescribed by the geometry of the deflectors. To this end both the adjustments 34 and 35 have rectangular diaphragms 36 and 37 that make vacuum tight seals with the walls 38 and 39 of their rectangular wave guides 40 and 41, which open into the respective opposite evacuated end cells 23 and 25 between irises 27 and 27' and 29 and 29' of deflectors 17 and 19. By moving plungers 34 and/or 35 selectively inwardly or outwardly to move the diaphragms 36 and/or 27 inwardly toward or outwardly away from their cells 23 or 25 the resonant frequencies in the deflectors 17 and/or 19 are selectively increased or decreased to the desired resonant frequency. For example, a total diaphragm movement of at least 1 millimeter is sufficient to change the resonant frequency sufficiently in the $\pi/2$ to $2\pi/3$ modes. Thus, both deflectors are brought to the same resonant frequency by adjusting the positions of the diaphragms 36 and 37 in shorts 30 and 31. Also, the deflectors are driven as independent oscillators and, although both deflectors don't need a variable short, two are provided therewith for greater range of tunability.

The oscillator circuit into which the first deflector 17 is inserted as a frequency determining element, comprises a microwave source 20, a variable phase shifter 43 and a directional coupler 44 as shown in FIG. 2. This arrangement forms closed loop 32 that oscillates if the gain in the loop is >1 and the phase shift=$(\pi+2n\pi)$. The source 20 provides the necessary gain and the phase shifter 43 is adjusted for positive feedback to produce the oscillations. This phase shifter 43 is advantageously employed with a klystron source 20 having sufficient gain for deflector 17, but a TWT amplifier 20 may be used also, in which case this phase shifter 43 is not required as the phase across the TWT can be conveniently changed by varying its helix voltage.

A fraction signal of about 1–2 watts, which is a minor part of the signal to deflector 17, is coupled out from the oscillation loop 32 through directional coupler 44 preceding the input 45 to deflector 17 of separator 11. A long phase compensated cable 46 transmits this fractional signal through directional coupler 65 to phase bridge 47. This bridge 47 compares the signals in the like loop 32 and 33 to keep the phase therein identical. To this end the bridge 47 produces an error signal that corresponds to the amount and direction of the error. This error signal is amplified by amplifier 48 to energize motor 49 in the appropriate direction. Motor 49 thereby adjusts phase shifter 50 to reduce the error signal in the bridge 47 to zero.

The deflectors 17 and 19 have like oscillating loops 32 and 33. Thus deflector 17 and 19 have adjustable shorts 30 and 31 formed with adjustors 34 and 35 coupled to cells 23 and 25, cables 51 and 51' connecting the shorts 30 and 31 to phase shifters 43 and 50, cables 52 and 52' connecting phase shifters 43 and 50 to sources 20 and 21, cables 53 and 53' connecting sources 20 and 21 to circulators 54 and 54', cables 55 and 55' connecting circulators 54 and 54' to directional couplers 44 and 56, cables 57 and 57' connecting directional couplers 44 and 56 to wave guides 58 and 58'. Wave guides 58 and 40 are connected in a vacuum tight arrangement through deflector 17 to complete loop 32 through source 20 and wave guides 58' and 41 are connected in a vacuum tight arrangement through deflector 19 to complete loop 33 through deflector 19. In case of a phase error difference between loops 32 and 33, the output of bridge 47 is amplified in amplifier 48 to actuate motor 49, which is mechanically coupled to variable phase shifter 50, thus automatically to adjust the second deflector 19 to be phase locked to the first deflector 17.

The limitation of the frequency range available depends on frequency pulling of a high Q oscillator ($\sim 10^8$). Consequently, the range is determined by the equivalent Q of the external circuit and the $Q_L$ of the deflector, i.e., the system can be analyzed as two coupled oscillators 32 and 33. The drifts in the resonant frequencies, however, are minimized by the described low operating temperatures, where the frequency shift is substantially independent of temperature changes.

Figure 3:
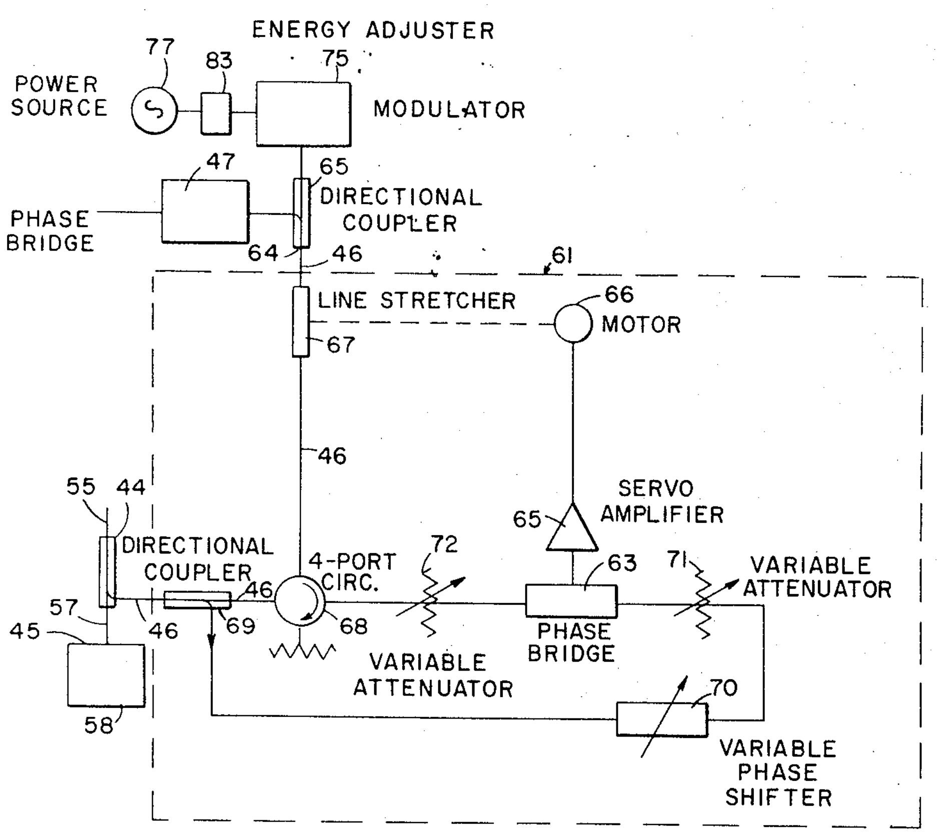
FIGURE 3 is a partial schematic diagram of the cable servo for the microwave system of FIG. 2.

In operation, the necessity of maintaining the correct phase relationship between deflectors 17 and 19 is such that a servo loop 61, shown in FIG. 3, holds constant the electrical length of the compensated cable 46, which transmits the signal to which the second deflector 19 is phase-locked. Advantageously, this servo loop 61 employs a reflected cable signal, such as is described in the above-cited copending application by the inventors of this application, which is assigned to a common assignee.

To this end, servo loop 61 having a phase bridge 63 compares the phase of the signal entering cable 46 with the phase of the signal reflected from an end 64 of a directional coupler 65, as shown in FIG. 3. As the electrical length of the cable 46 changes due to any effect, such as temperature, humidity and pressure variation, the correction signal produced by the phase bridge 63 actuates amplifier 65 to energize servo-motor 66 to adjust the length of variable line stretcher 67, thus compensating for the phase drifts in cable 46. Circulator 68, directional coupler 69, adjustable phase shifter 70, variable attenuator 71, bridge 63 and adjustable attenuator 72 complete loop 61 so that bridge 63 responds to the phase signal entering cable 46 at coupler 44 and leaving cable 46 at coupler 65 to the reflected signal passing back through cable 46 from coupler 65 to produce the error signal in phase bridge 63 between the input and reflected signals in cable 46. This error signal thus actuates motor 66 to adjust line stretcher 67 in the proper direction to make the phase of the input and reflected signals in cable 46 the same.

In one embodiment of this invention, having a cable 46 that is up to 7 km. long, spurious signals are removed from the input and reflected signals in cable 46 by an electrically variable load 75 on one end of coupler 65. One such variable load is a load having a diode modulator with a separate electrical energy source 77, such as is commercially available. When the diode modulator 75 is not energized from its energy source, no microwave power is reflected back therefrom through directional coupler 65 into cable 46. When the modulator is energized from its source most of the microwave power reaching the modulator 75 from cable 46 through coupler 65 is reflected back through cable 46 in the opposite direction. Advantageously, this modulator 75 is energized at 1 kHz. In an embodiment for a short cable where spurious signals are not a problem, the modulator 75 can be replaced by an inexpensive short like short 30 or 31.

In accordance with the described system of this invention, the electrical length of cable 46 is held within $\pm 1°$ of phase at 3 gHz., corresponding to $\pm 3 \times 10^{-2}$ cm. Also, the phase shifter 43 provides an initial phase adjustment between deflectors 17 and 19. Upon energization the deflectors 17 and 19, which are arranged at spaced intervals along the evacuated beam tube 15, deflect charged particles from the beam at an angle to the beam equilibrium axis 16 in the tube 15, such as is required in connection with the BNL AGS. The energization of deflectors 17 and 19 is continuous. However, RF pulsed operation can also be used.

Each deflector loop 32 and 33 is energized seriatim through their own respective klystron amplifiers 20 and 21, circulators 54 and 54', directional couplers 44 and 56, couplers 45 and 45' to wave guides 58 and 58' for cells 22 and 24, through the adjacent cells 13 of deflectors 17 and 19 to cells 23 and 25 and to couplers 79 and 81 from wave guides 40 and 41 to cables 51 and 51' for connection back in a circuit in loops 32 and 33 through phase shifters 43 and 50 back to klystron amplifiers 20 and 21. The adjustable shorts 30 and 31 thus adjust the path length of the electric fields propagating through each deflector for tuning them to match the resonant frequencies in each deflector at the same desired mode.

In very large accelerators having energies up to 200 gev. or more, where the distance of cable 46 is above several kilometers, diode switch 75 modulates the reflected signal in cable 46 at 1 kHz. rate. The switch 75, however, is adjustable through a suitable adjustment means 83, such as a variac that adjusts the energy from source 77 to modulator 75, to change the impedance value of modulator 75 from short to infinity. This modulator 75 thus recovers the reflected signal from multiple reflection noise generated by slight irregularities in cable 46. Since the described system for measuring electrical length with a reflected signal provides an accuracy of at least $\pm 2°$ for an attenuation of 52 db, a length in cable 46 of $\sim 7$ km. for the typical RF separator 11 of this invention can be used.

It is noted from an experiment performed on a 1 m. long deflector for a $\pi/2$ mode that the range of tunability is over $\sim 1$ mHz. It is, however, necessary to use deflector structures where the resonances are not spaced too closely together, such as in the $\pi$ mode, as the resulting frequency change due to the change of the short position would be too small. The range of a loaded structure, therefore, is between the $\pi/2$ and $2\pi/3$ modes.

The system of this invention has the advantages of providing a long pulse time RF charged particle separator for high energy beams up to 200 gev. or more. Moreover, although this pulsed operation is more economical, the system of this invention can be used in continuous wave operation. Additionally, this invention provides simple adjustable and phase-locked high Q or superconducting deflectors that operate stably with commercially available microwave energy sources, such as klystrons, TWT's and the like, to provide a practical and economic standing wave charged particle separator.

What is claimed is:

1. A radio-frequency separator for high energy charged particle beams traveling along an equilibrium axis in an evacuated tube, comprising first and second oscillator circuits forming first and second spaced high Q deflectors for providing electric fields propagating through each deflector, each circuit having a separate microwave energy source, circulator, directional coupler, deflector and phase shifter arranged seriatim in a closed loop to form respective main input signals for energizing said deflector to produce electric charged particle deflecting fields propogating through each deflector at resonant frequency modes from $\pi/2$ to $2\pi/3$, phase bridge means for phase locking the respective deflectors, and an adjustable short in the deflectors for varying the path length of the electric fields propogating through each deflector for tuning them to match the resonant frequencies in each deflector at the same mode.

2. The invention of claim 1 in which said phase bridge means, comprises a motor driven phase shifter connected in at least one of said closed loops, and cable means having an electrically variable load on a phase bridge responsive to said main input signals for detecting a phase difference error in said cable input signals and producing a corresponding correction signal therefrom, said correction signal actuating said motor driven phase shifter to remove said phase difference error to make the phases of said input signals the same.

3. The invention of claim 1 in which the adjustable short is at one end of the respective deflectors of said separator.

4. The invention of claim 1 in which the adjustable short is a metal diaphragm at one end of a rectangular wave guide having means for displacing the center of the diaphragm at least 1 mm.

5. The invention of claim 4 in which said diaphragm provides a vacuum partition to maintain a vacuum in said deflector.

6. The invention of claim 1 in which the deflectors are maintained at superconducting temperatures for continuous operation.

7. The invention of claim 1 in which said bridge means includes a 7 km. cable connecting said first and second oscillator circuits, having wave reflecting means for adjusting the electrical length of said cable and means for modulating the reflected wave to reduce spurious signals.

References Cited

UNITED STATES PATENTS 3,278,745 10/1966 Loew -------------- 250—41.92

OTHER REFERENCES

"Investigations of Traveling Wave Separators for the Stanford Two-Mile Linear Accelerator," Altenmueller et al., The Review of Scientific Instruments, vol. 35, No. 4, April 1964, pp. 438–442.

ARCHIE R. BORCHELT, *Primary Examiner.*

C. E. CHURCH, *Assistant Examiner.*